United States Patent
Letellier et al.

(10) Patent No.: US 8,601,132 B2
(45) Date of Patent: Dec. 3, 2013

(54) RECEPTION OF AUDIO-VISUAL CONTENT ADDRESSED TO SEVERAL DEVICES

(75) Inventors: Philippe Letellier, Saint Gregoire (FR); Pierre Houeix, Cesson Sevigne (FR); Jean-Francois Fleury, Beijing (CN)

(73) Assignee: Thomson Licensing (FR)

( * ) Notice: Subject to any disclaimer, the term of this patent is extended or adjusted under 35 U.S.C. 154(b) by 363 days.

(21) Appl. No.: 12/084,537

(22) PCT Filed: Oct. 26, 2006

(86) PCT No.: PCT/EP2006/067836
§ 371 (c)(1),
(2), (4) Date: Jul. 8, 2009

(87) PCT Pub. No.: WO2007/051761
PCT Pub. Date: May 10, 2007

(65) Prior Publication Data
US 2009/0300185 A1   Dec. 3, 2009

(30) Foreign Application Priority Data
Nov. 7, 2005   (FR) ...................................... 05 53361

(51) Int. Cl.
*G06F 15/16* (2006.01)
*H04N 7/173* (2011.01)
*H04N 5/50* (2006.01)

(52) U.S. Cl.
USPC ............. 709/227; 709/219; 709/230; 725/87; 725/94; 725/97; 725/104; 725/119; 348/731

(58) Field of Classification Search
CPC .................... H04N 21/47202; H04N 7/17318; H04N 7/17336; H04N 21/2543; H04N 21/47214; H04N 21/6587; H04N 21/6125; H04N 21/4331; H04N 21/44222
USPC ........ 709/227–229; 725/86–87, 90, 101, 104, 725/112–113, 97–98
See application file for complete search history.

(56) References Cited

U.S. PATENT DOCUMENTS

2002/0129371 A1* 9/2002 Emura et al. .................... 725/61
2003/0005452 A1* 1/2003 Rodriguez ...................... 725/86
(Continued)

FOREIGN PATENT DOCUMENTS

| JP | 11088860 | 3/1999 |
| JP | 2001258005 | 9/2001 |

(Continued)

OTHER PUBLICATIONS

Chris Loeser et al.: "Distributed Video-on-Demand Services on Peer-to-Peer Basis", Proceedings of the International Workshop on Real-Time Lans in the Internet Age, Jun. 2002, pp. 1-4.

(Continued)

*Primary Examiner* — Evans Desrosiers
(74) *Attorney, Agent, or Firm* — Tutunjian & Bitetto, P.C.

(57) ABSTRACT

The present invention relates to a method for receiving audio-visual programs sent by a server to at least two reception devices. Initially, a first user requests a document from the server that establishes a unicast stream to download said document. Then, a second user requests to receive the same document, even truncated by a part. The server studies the proposal and possibly, for a lower price, agrees to the download. The server then switches the broadcast of the document from a unicast stream to a multicast stream, the first and second devices receiving said document via the same multicast stream.
The invention also relates to a device for receiving audiovisual content and a server for implementing the method.

11 Claims, 4 Drawing Sheets

(56) References Cited

U.S. PATENT DOCUMENTS

2003/0005465 A1* 1/2003 Connelly ..................... 725/119
2005/0081244 A1* 4/2005 Barrett et al. .................. 725/97
2006/0039375 A1* 2/2006 Bahls ........................... 370/390

FOREIGN PATENT DOCUMENTS

| | | |
|---|---|---|
| JP | 2002353964 | 12/2002 |
| JP | 2003027571 | 2/2003 |
| JP | 2004235921 | 8/2004 |
| KR | 20050103558 | 11/2005 |
| WO | WO 2004/003769 | 1/2004 |

OTHER PUBLICATIONS

Search Report dated Jan. 11, 2007.

* cited by examiner

RECEPTION OF AUDIO-VISUAL CONTENT ADDRESSED TO SEVERAL DEVICES

This application claims the benefit, under 35 U.S.C. §365 of International Application PCT/EP2006/067836, filed Oct. 26, 2006, which was published in accordance with PCT Article 21(2) on May 10, 2007 in French and which claims the benefit of French patent application No. 05 53361, filed Nov. 7, 2005.

The invention relates to a method of receiving audio and/or audiovisual documents on user request, a distribution server and devices implementing the method.

These days, the broadcasting of audiovisual content to multiple users is increasingly widespread. Several solutions exist for this such as broadcasting on terrestrial or satellite networks or on data networks. These are presently in full expansion, particularly with the deployment in numerous networks of high bitrate access to the Internet by means of DSL (Digital Subscriber Line) technology.

On these broadcast networks, the broadcasting of live programs, without specific query from the user is a mature and well-supported technology.

The network context of the present invention is that of audiovisual servers capable of providing audiovisual documents on-demand, and of any device (for example domestic) capable of displaying audiovisual documents received from a network and of dialoguing with a server using the same network. The audiovisual document is typically transmitted over a unidirectional broadcast network. Access to audiovisual documents is generally conditioned by a payment from the user of the device. Electronic Program Guides (EPG for short) propose users a catalogue of audiovisual documents, and particularly films. The user chooses a document from this catalogue and after payment for access rights, receives the means to decode and display it unencrypted. The document is broadcast in encrypted form on the broadcast network, and the receiver decrypts the document using a code previously received. Another manner of proceeding consists in establishing a link with the document provider server, querying his catalogue, and downloading the document following a payment. In this case, the link is unicast, which is a bi-directional link between the server and the user who requests this document, the document is downloaded only to this user. The link can be carried out in unicast mode. The price, which is fixed by the document provider, is generally displayed by the EPG, the user therefore knows the cost of the download before committing himself. These systems called "Content on Demand" allow each subscriber to select a document from a catalogue, then receive it and view it, the document is possibly stored.

The document of LOESER Ch et al entitled "Distributed Video-on-demand services on Peer-to-Peer Basis" published in June 2002 discloses a system based on "Peer-to-Peer" technology. Such architecture allows a user to connect to a given server and download a document. Once it has all been sent, the document can then be downloaded to other users.

In this context, the transmission bandwidth of the network must be properly managed. In contrast to the unidirectional broadcasting that allows several users to receive the same content while broadcasting it just once on the network (the amount of data supported by the network does not depend on the number of users), the broadcast of content on demand establishes a stream of data on-demand (the amount of data supported by the network is then proportional to the number of users of the content on demand service). The over-consumption of network resources that results is problematic for a video-on-demand service (irrespective of the network) and limits the deployment of this service.

The present invention relates to a method for receiving audiovisual documents sent by a server to at least a first receiver, characterized in that it comprises the following steps:
  a step of establishing a unicast link between a server and a first receiver device for the transmission of the first part of a document following a download request of said first device,
  a step of establishing a multicast link to the first device and to at least a second device to receive a second part of the same document.

In this way, a second device can receive at least part of the document transmitted to a first device, and this without needing to establish a second communication and more bandwidth than that to attribute to the first device.

According to a first improvement, the server sends the second device a proposal for the reception of the second part of the document for a price lower than the price proposed to the first device. The second device displays the document identifiers available with the price. In this way, the user is financially compensated for having received only part of the document with respect to the user of the first device, the latter receiving the entire document. According to another improvement, the price proposed by the server is proportional to the length of the second part of the document. Hence, the rebate accorded for the reception of only part of a document is proportional to the length of the missing part.

According to another improvement, the transmission of the second part of the document to the second device is proposed until a predetermined part of the document is broadcast. Hence, the proposal to transmit at least a part of the document occurs only at the start of the document download, because thereafter the chances of interesting a user are slight. According to another improvement, the second device receives a dynamic summary during the transmission of the document, and displays at least part of the dynamic summary to provide information on the contents of the first part of the document already transmitted to the first device. In this way, the user of the second device can be made aware of the first part of the document before receiving the second part.

According to another improvement, the second device displays a part of said dynamic summary after agreement to receive a part of the document. The display of said summary terminates when the level of knowledge of the summary merges with that of the document being broadcast.

According to another improvement, the server establishes a new unicast link to transmit the first part of the document to the second device, at the same time as the multicast transmission of the second part. The second part received is temporarily stored in the device and extracted to be viewed following the first part.

According to a variant, following the transmission of the second part of the document to the two devices, the first part of the document is transmitted to at least a second device, such that the second device receives the entire document. In this way, the user of the second device can be aware of the missing part of the document that he ordered. According to another improvement, the first and second transmitted parts of the document received are recorded at the level of the second device. The two parts of the recorded document are then viewed in the correct order. In this way, after transmission and recording of the parts of the document, the user can view it in better conditions.

The present invention also relates to a server comprising a database containing documents, the server having an interface to transmit at least part of a document in unicast mode and an interface to transmit at least part of the same document in multicast mode to a plurality of receivers, characterized in that it comprises a means of receiving a request sent by a second receiver to receive a document currently being transmitted in unicast mode to a first receiver, and a switch management means to stop the transmission in unicast mode to the second receiver and to establish the transmission in multicast mode to the two receivers of the part of the document not yet transmitted.

The present invention also relates to an audiovisual receiver comprising a means of receiving documents, a means of displaying a catalogue of documents and a means of introducing commands, characterized in that it also comprises a first selection means of an entire document triggering the reception means to receive this entire document from a transmitter via a unicast link, a second selection means of a document split into a first and second parts, the second selection means triggering the reception means to receive the second part of the document from the transmitter via a multicast link.

The present invention also relates to an audiovisual receiver comprising a means of receiving documents, a means of displaying a document and a means of introducing commands, characterized in that it also comprises a first reception means of a first part of a document via a unicast link, and a second reception means of a second part of the same document via a multicast link, allowing the transmission of said document to other devices, the display means displaying the first part then the second part.

The present invention will now appear with more details, within the scope of the description that follows, of embodiments given as an example by referring to the figures attached wherein.

Figure 1:
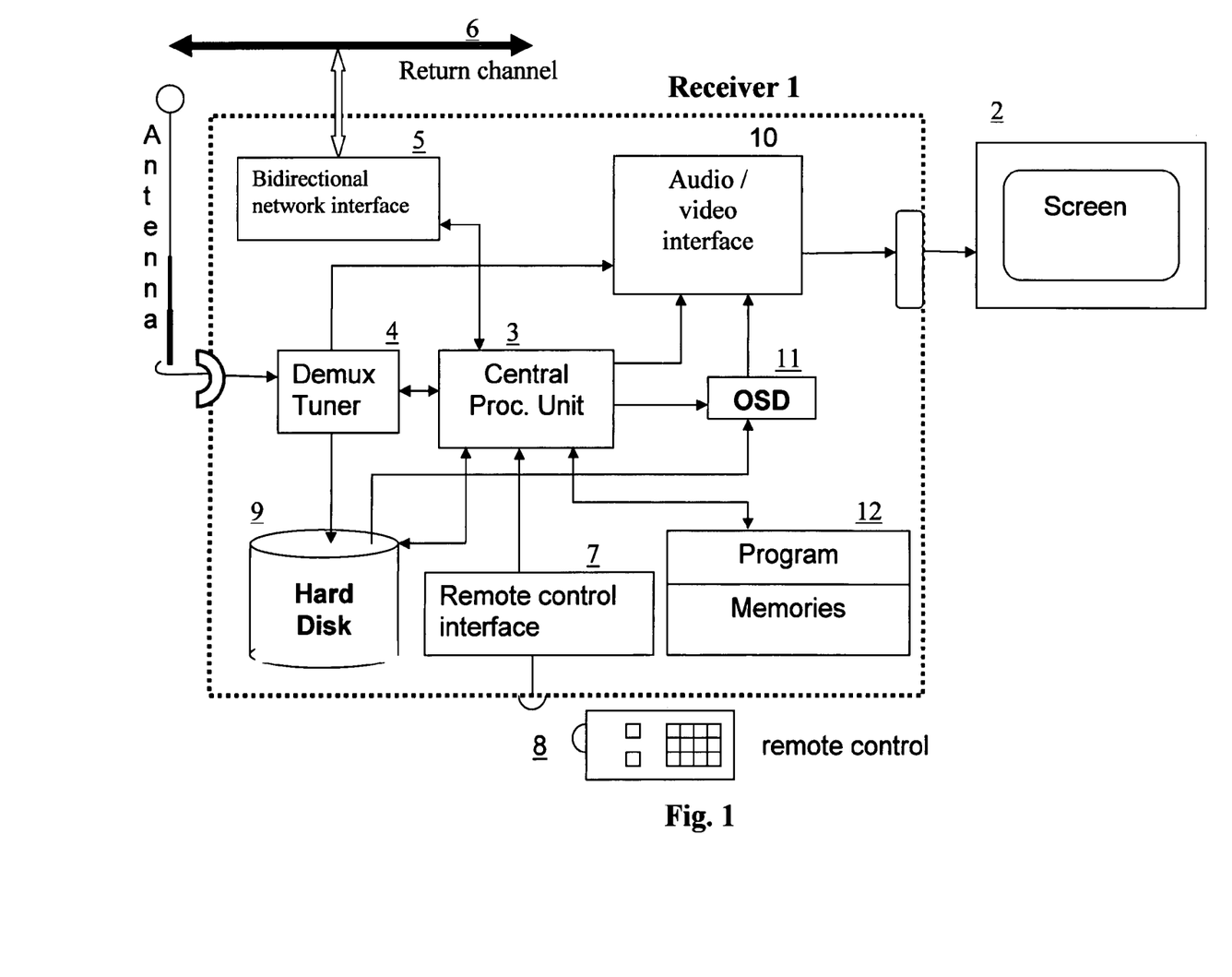
FIG. 1 is a block diagram of an audiovisual receiver for the implementation of the invention.

A description of the functioning of the audiovisual receiver 1 equipped with a display device 2 will first be made with reference to FIG. 1. The receiver comprises a central processing unit 3 connected to a program memory (ROM) 12 and a working memory (RAM), and an interface 5 for bi-directional communication with the network 6. This interface is also called the return channel. This network is for example an Ethernet network. The receiver can also receive audio/video data from a broadcast network via a receiving antenna associated with a demodulator 4. The antenna can also be replaced by a physical connection to any type of high bitrate local digital bus allowing transmission of audio/video data in real time, such as a cable access point or a DSL connection. The receiver also comprises a signal receiver 7 to receive signals from a remote control 8, a means of recording 9 to store at least one audiovisual document, and an audio/video decoding logic 10 for the generation of audiovisual signals sent to the television screen 2. The nature of audiovisual documents being digital, the means of recording 9 is preferentially a hard disk (HDD), it can also be an optical recordable disk player/recorder (DVD-RAM).

The remote control has direction buttons ↑, ↓, → and ← and the buttons: "OK", "Buy" and "Send" whose use will be seen further on in the description. The receiver also has a clock (not represented) allowing the activation of the receiver when a document to be recorded is about to be downloaded.

The receiver also comprises a display circuit 11 of data on the screen, often called OSD circuit, "On Screen Display". The OSD circuit is a text and graphics generator that enables the on screen display of menus, pictograms (for example, a number corresponding to the channel displayed), or that allows two audiovisual contents to be mixed. The OSD circuit is controlled by the Central Processing Unit 3 and a program called "Audiovisual Contents Control Program" ACCP for short that resides in the memory 12. The ACCP program is typically constituted by a program module written in the read-only memory and parameters recorded in the working memory. The ACCP program can also be realized in the form of an ASIC type specialized circuit for example. This circuit can have security functions allowing the realization of a payment following the decision of a user to view a paying program.

The receiver receives the identification data of the audiovisual documents from the return channel 6 or the broadcast network. This data includes displayable elements, the title for example or a picture from the trailer. Using an EPG and the remote control buttons, the user selects one or more documents to receive and record them on the hard disk 9.

Figure 2:
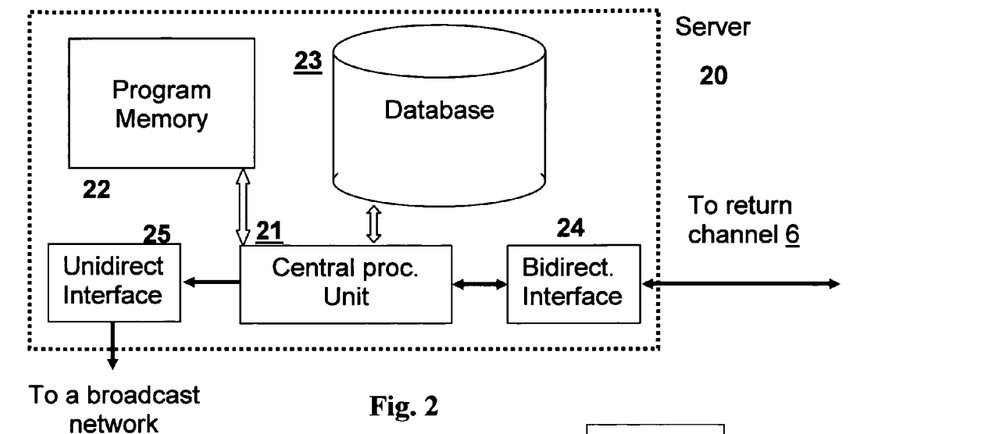
FIG. 2 is a diagram showing the different elements of a server according to the invention.

The Content on Demand (CoD) server 20 described in FIG. 2 comprises a central processing unit 21, a program memory 22 containing the ACCP program on the server side, a memory containing an audiovisual database 23 in a storage area preferably realized by a hard disk or a SAN and a communication interface 24 to establish bi-directional communications via a bi-directional network 6 with the receivers 1 previously described. The database 23 notably contains the catalogue of available documents. The CoD server is also in contact with the broadcast network manager by means of an interface 25. It notably communicates, to this manager, the orders to broadcast documents at specific times and dates. According to a preferred embodiment, the unidirectional 25 and bi-directional 24 communication interfaces are identical and use the same network. The differentiation is carried out at the level of the addresses of each communication frame.

After having described the different elements of the invention, an explanation of how they cooperate will now be made.

Figure 3:
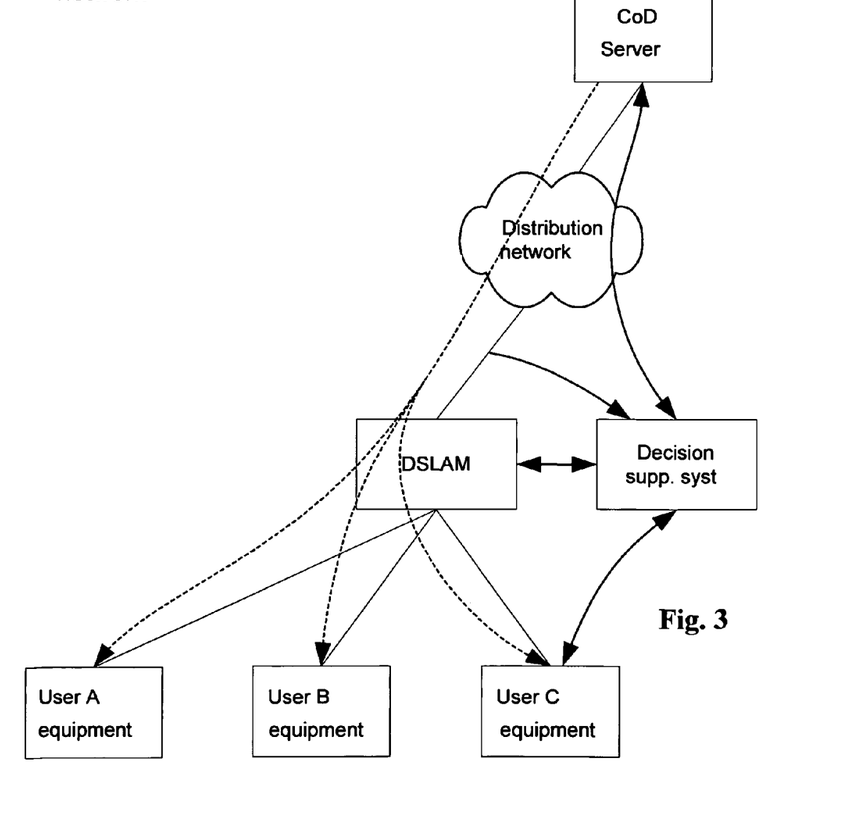
FIG. 3 is a diagram showing the different elements of a system for the distribution of a document and the main exchanges.

FIG. 3 illustrates the principle elements of the system and the exchanges between these elements according to an embodiment. The CoD server dialogues via a broadcast network with a decision support system that will or will not grant the right to download to this or that subscriber. The CoD server is connected to a DSLAM (Digital Subscriber Line Access Multiplexer). This device allows a user to connect to a high bitrate data network via the paired electrical conductors of the public telephone network. The DSLAM is a network element allowing, among other things, the routing of IP traffic and the replication of multicast packets. The decision support system is used to order the transition from unicast to multicast mode. The DSLAM should be considered as an embodiment, any other router will suffice.

[0]The subscribers who each have a receiver 1 can establish unicast links with the DSLAM and the decision support system. The subscribers dialogue with the CoD server via the distribution network.

Figure 4:
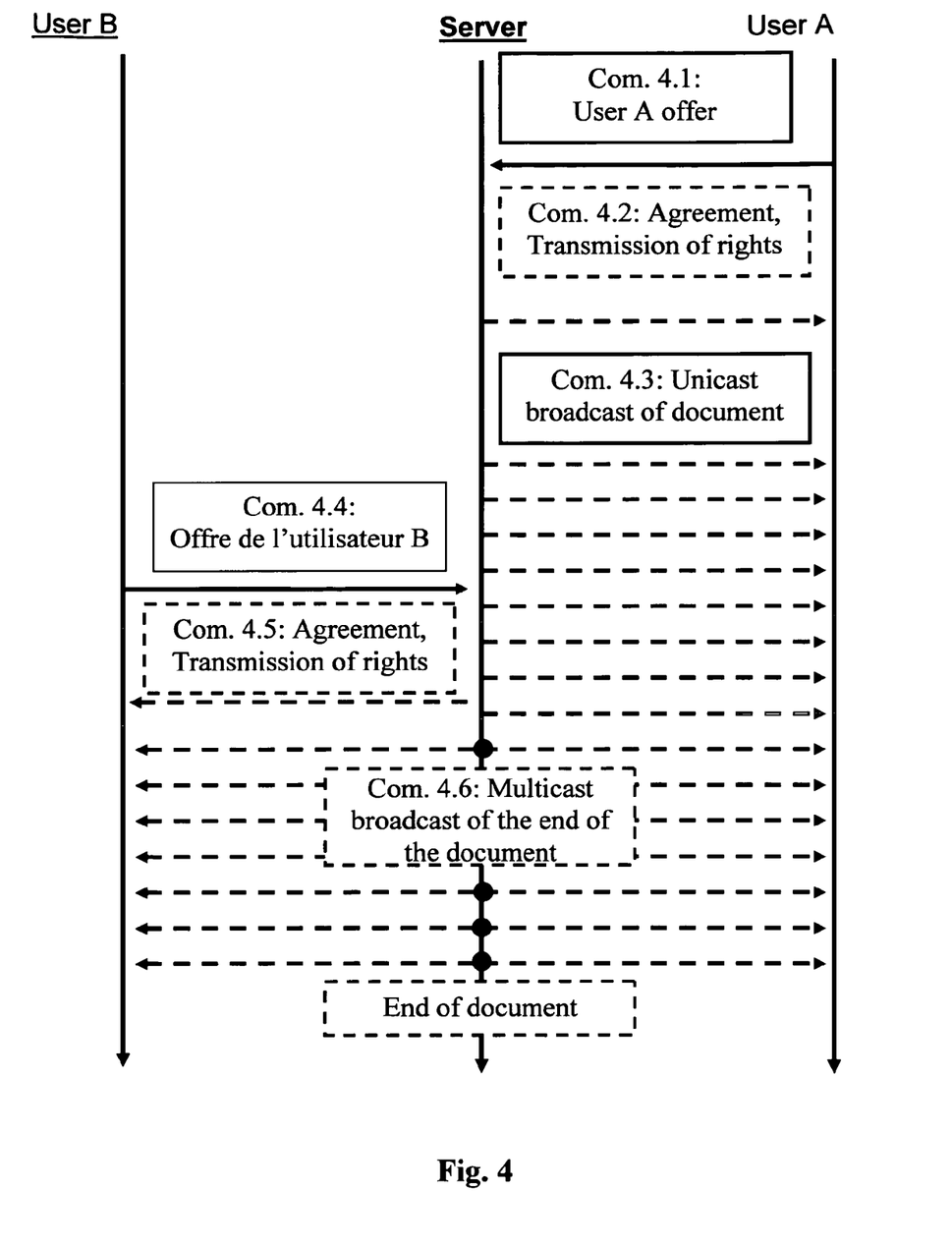
FIG. 4 shows the different dialogues between two users and the server.

FIG. 4 describes the exchanges between the CoD server and two audiovisual receivers 1 belonging to subscribers. The successive communications are numbered 4.1 to 4.6.

Assume that during a communication. 4.1, a subscriber A orders a document from the CoD server using his ACCP program initiated on his receiver 1. After having paid a certain sum M, a unicast communication is established between the CoD server and the subscriber device A via the distribution network, and the server grants the subscriber device the right to receive the document (communication 4.2). A unicast communication is characterized by the fact that it is only carried out between the server and a single specified device. In the case of a communication over the IP network, the address contained in the data frames sent by the server is that of the subscriber A. During a communication 4.3, the server transmits the audiovisual document to the subscriber A who can view it.

Then after a short period of time for example a few minutes later, another subscriber B makes a request from the CoD server for the same video (communication 4.4) also using his ACCP program. The CoD server then notifies a decision support system (positioned at the level of the DSLAM for example) of the possibility of establishing 2 identical streams staggered by 5 minutes at the level of the DSLAM.

The decision support system will then analyze the current use of the network upstream of the DSLAM and will base a reduced price offer of the video on this information for the subscriber B. It will define a sum M', less than M, that reflects the status of the network. If the network traffic is light, the necessity to economize the broadcast of the same stream in parallel is minor and so the reduction will not be great (for example M'=M*80%). However, if the network is close to saturation, the reduction could be much greater to incite the subscriber B to choose this solution (for example M'=M*20%). Indeed, as the network cannot supply an extra stream, if the new subscriber does not accept the proposal at a reduced price, then he quite simply cannot view the film and a sale will be lost.

The decision support system notifies the subscriber B that another network subscriber ordered the same document a few minutes beforehand and that, if he agrees to miss the first 5 minutes of the video, he will be able to receive the desired document. In exchange, he will only pay the amount M'.

If subscriber B refuses the offer, a second unicast stream between the CoD server and subscriber B is immediately established if this is still possible or the network bandwidth allows it, as the network consumption is then twice the bandwidth of the stream.

If the subscriber B accepts the offer, the server transmits the reception rights of the document during the communication 4.5. The server then defines a group of two devices for the document reception. A multicast distributed to subscribers A and B is then set up from the CoD server (unidirectional communication 4.6). Subscriber B can then start to watch the video. Subscriber A connects (without interruption of the video) to this multicast stream. Then, the bandwidth used is only that of one stream, for both subscribers.

From the moment when the decision support system informs the server that the multicast stream must replace the unicast stream, the server sends the unicast stream in parallel to A and the multicast stream only to B (the routing for B having been configured by the decision support system), and this in a short predetermined time period (in the order of a few seconds). Receiver A will itself be informed by an asynchronous mechanism (of the RTSP type, a mechanism often used in VoD systems) of the availability of a second multicast stream and will be able to connect to this new multicast stream to receive audiovisual data. The subscription request will be processed specifically by the DSLAM that will previously have been notified of the change of stream by the decision support system and that will have stored the intermediate data not already sent to receiver A. The DSLAM will stop the unicast stream and start the multicast stream to A upon reception of the subscription request. In this way, the link between the DSLAM and receiver A will not be overloaded and there will be no loss and no duplicates.

In theory, the offer can be made at any moment in the video broadcast, but so that the offer is of commercial value, the server can only propose it if the broadcast is in the first ten percent of the broadcast of the entire document, for example for a 2 hour document there is no commercial interest in proposing the offer once 12 minutes of broadcasting have passed. It appears that an offer to receive a document truncated by more than 10% has little hope of being accepted by a user, whatever the proposed price.

Figure 5:
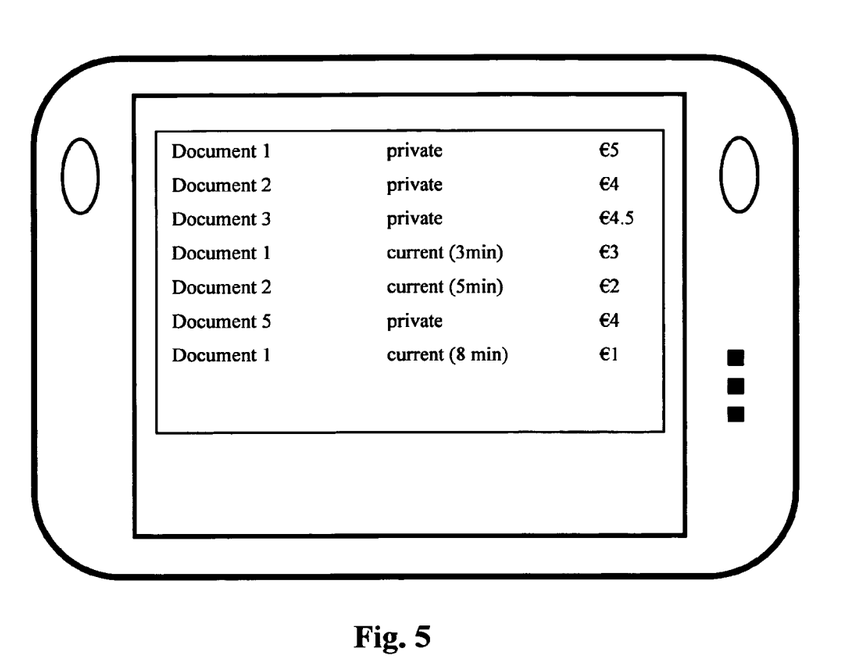
FIG. 5 represents a screen appearance allowing a user to choose a document.

According to a preferred embodiment, user B is not aware at first that another user (A to be specific) is already receiving the desired document. A variant embodiment consists in that the user B sees on his menu the identifiers of at least part of the available documents, whether or not they have already been ordered by another device, and therefore being downloaded. FIG. 5 shows an example of a menu as an illustration of this variant. This menu produced by the ACCP program of the device of subscriber B comprises a price and the duration of the document already broadcast. In this way, subscriber B can know the truncated time that he will not receive if he accepts this offer. Advantageously, the price proposed is calculated in proportion to the truncated time of the document. For example, if subscriber B is missing 3 minutes from the beginning of the document then the price drops by 10%, and if the subscriber is missing the first 12 minutes, the reduction goes up to 30%. The proposals made are limited to documents where the broadcast has not exceeded a certain time, for example 10%, beyond which the EPG is unnecessarily cluttered as very few users accept such offers. In the menu illustrated by FIG. 5, user B sees that document 1, 2, 3 and 5 are available and that he can order them for himself. These documents are marked as "private" which signifies that he will receive them personally and in their entirety, by establishing a unicast link with the server. The user also sees that he can receive some of these documents that have just started to be broadcast. The price of these documents is therefore reduced. Consider the case of document 1 whose value is fixed at €5 in Unicast mode, this same document truncated by the first three minutes is not worth more than €3, and truncated by the first 8 minutes, is not worth anymore than €1. Document 2 in its entirety is worth €4, and truncated by the first five minutes, it is worth only €2. It is seen then that the more a document has been broadcast, the more the price drops. Advantageously, the server can develop an equation giving the cost of the document according to the time already broadcast. Namely, the following parameters, T: total duration of the film t: time passed since the start of the broadcast P: price of the entire document p: price proposed taking into account the broadcast already made. An example of an equation is: if t/T<0.1 then p=P×(1−8×t/T). According to this example, when 10% of the document has been broadcast, the offer consists in proposing the remaining part at 80% of the normal price.

An improvement of the invention consists in adding a temporary unicast stream in the offer that the server makes to subscriber B. For example the menu presenting the offer to receive a document with the beginning truncated displays what is actually broadcast to subscriber A in image insertion mode. In this way, this visualization of a part of the document reinforces the interest of subscriber B. Furthermore, if he has already seen the document, he can determine which moment the broadcast is at. This improvement means that he can make his decision whether or not to download the document while at the same time getting some idea of its content while viewing the menu. Even partial visualization adds commercial value to the offers proposed by the menu. The visualization by insertion is activated between the CoD server and subscriber B while he makes his choice. The visualization is limited to the duration of the offer, approximately a few minutes. The appearance of the screen presented in FIG. 5 is regularly updated. The prices change and some documents that have been broadcast for too long disappear, for example documents where at least 10% has been broadcast, or documents that have been broadcast for more than twenty minutes regardless of their duration.

Another improvement of the invention consists in that in cases of acceptance by subscriber B, the server proposes a dynamic summary of the truncated part of the document. In this way, subscriber B can rapidly be made aware of the content of the document up to the same level as is actually being received by subscriber A. A first variant consists in that this summary is a unicast stream composed of important video sequences characteristic of the truncated part. Possibly, these sequences comprise an explanatory text. A second variant consists in that, as soon as subscriber B accepts the offer, subscriber B receives a dynamic summary text corresponding to the truncated part and the multicast stream is established for the two subscribers A and B. An embodiment of a dynamic summary can be found described in the patent EP 1 100 271 submitted by the applicant. Then, an interactive application displays the text summary in the form of a banner at the bottom of the screen. The display of at least part of said dynamic summary is interrupted when the level of knowledge of the summary joins that of the document. Then, the interactive application stops and disappears from the memory of the receiver.

This example is not limiting on the number of type B subscribers that can connect during the broadcast of the document requested by subscriber A. During a period of strong demand, the evening for example, several users may request the same stream in very short intervals. Now consider the following example:

Subscriber A makes the first request at the time T for a sum M. According to the system previously described, if subscriber B wants to see the same film at T+2 minutes, the decision support system will offer him a reduction. If he accepts, the CoD server switches the broadcast of the document onto a multicast stream and informs subscribers A and B. For A the switch is carried out in a transparent manner, the visualization system itself managing the reception of the unicast stream in a multicast stream. Let us imagine that another subscriber C, wants to see the same film at T+4 minutes. The decision support system can then propose a reduction (identical or not to that of B) if he agrees to miss the first 4 minutes of the video. The system is indeed still viable and even simplified in this case because if he accepts, it suffices to send him the multicast stream too: the interaction is then concentrated at the level of the DSLAM and no change in the stream is necessary for the other subscribers.

Hence, the number of subscribers of this document distribution system is in theory unlimited.

Another improvement of the invention consists in that the receiver 1 has a means of storing at least part of a broadcast document and the time shift function. This function enables a document to be received in real time, to be stored temporarily and then to be reproduced a certain time after its reception.

According to this improvement, when the server establishes a multicast link so that user B receives the second part of the document, it establishes a unicast link to the device of user B at the same time so that this user can also receive the first part of the document. Then, at the same time that user B sees the first part, his receiver records the second part transmitted by the multicast link. Then, when the entire first part is transmitted, the receiver of B extracts the audiovisual data from the memory and displays the second part with a time shift equal to the duration of the first part. In this way, the user can see the entire document and not perceive a change in the mode of reception: unicast and multicast.

Another improvement of the invention consists in that the document requested by subscriber B is destined to be entirely recorded to be viewed later. The device of subscriber B then records the document in two parts: a first part that begins at the start of the document and stops at a time Tcom where the switch from a unicast stream to a multicast stream occurs, and a second part that begins at Tcom and terminates at the end of the document.

Figure 6:
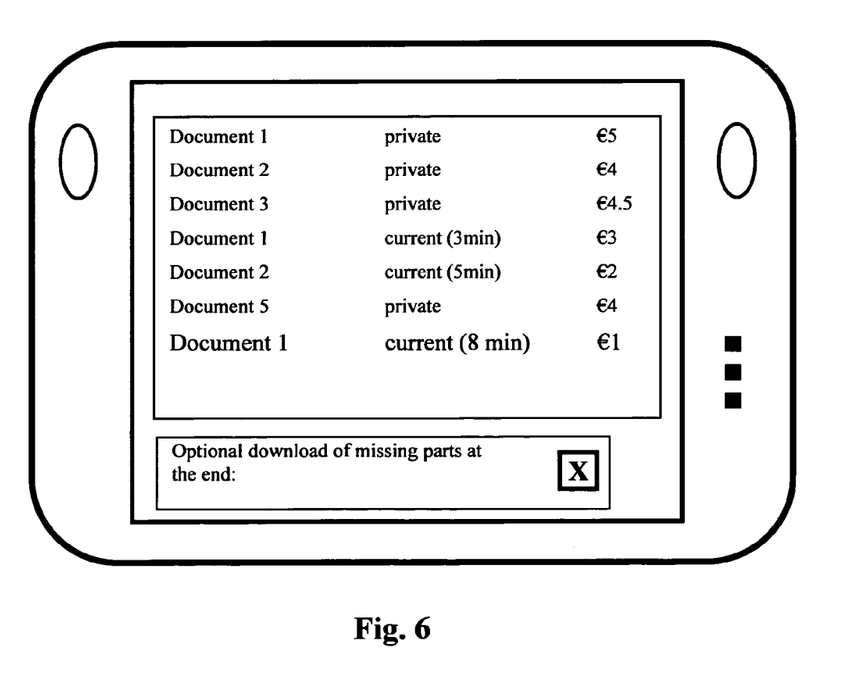
FIG. 6 represents a screen appearance allowing a user to choose a document according to an improvement of the invention.

According to this improvement, the decision support system informs subscriber B and proposes that the missing part will be broadcast at the end of the broadcast of the document. In this way, his receiver can ultimately record the entire document. This improvement is illustrated by FIG. 6. The elements of the menu from FIG. 5 are retained, the ACCP program causes a command banner to appear at the bottom of the screen allowing the user to select the option to download the missing part. The user selects this option and his response is transmitted to the server. If subscriber B accepts the offer by selecting this option, the server that has been broadcasting the document in unicast mode for a certain time carries out the following operations in order:

termination of the broadcast of the document in Unicast mode and broadcast of the document in multicast mode, at the same time the devices of subscribers A and B are notified of the new address of the multicast stream.

broadcast of the second part of the document in multicast mode,     broadcast (for the type B subscriber or subscribers) of the first part of the document.

The device of subscriber B records the two parts of the document and can thereafter display the two parts in the correct order.

Advantageously, the device of B notifies the user when the server starts to diffuse the first part of the document and prompts the user to start to view it. If the user accepts by introducing a command, then the device of B displays the content currently broadcast. When the first part ceases to be broadcast, the device of B switches automatically and extracts the second part of the document from the memory. Hence, the user sees the document in its entirety and maximum use was made of the network bandwidth.

The invention claimed is:

1. A method implemented in a content on demand server for transmitting an audiovisual document to a first receiver and a second receiver, wherein the method comprises the following steps:

receiving a request for transmission of the audiovisual document from the first receiver;

establishing a unicast link between the content on demand server and the first receiver;

initiating transmission of the audiovisual document to the first receiver via the unicast link;

receiving a request for transmission of the audiovisual document from the second receiver during transmission of the audiovisual document to the first receiver via the unicast link;

transmitting to the second receiver a proposal for transmission of a truncated version of the audiovisual document for a price value less than a price value proposed to the first receiver for the transmission of the audiovisual document wherein the truncated version of the audiovisual document is that part of the audiovisual document that has not yet been transmitted to the first receiver, wherein the price value proposed to the second receiver is dependent on an amount of traffic on a network used for transmission of the audiovisual document or is proportional to a duration of the truncated version of the audiovisual document;

receiving a request from the second receiver for transmission of the truncated version of the audiovisual document;

establishing a multicast link between the content on demand server and the first receiver and the second receiver; and terminating the unicast link between the content on demand server and the first receiver.

2. The method according to claim 1, wherein the transmission of the truncated version of the audiovisual document is only proposed to the second receiver up to the transmission of a predetermined fraction of the audiovisual document to the first receiver.

3. The method according to claim 1, wherein a dynamic summary of said audiovisual document is transmitted to the second receiver to provide information on contents of a fraction of the audiovisual document already transmitted to the first receiver.

4. The method according to claim 1, wherein a fraction of the audiovisual document already transmitted to the first receiver is transmitted to the second receiver concomitantly with the transmission of the truncated version of the audiovisual document for recording by the second receiver.

5. The method according to claim 1, wherein a fraction of the audiovisual document already transmitted to the first receiver is transmitted to the second receiver subsequent to the transmission of the truncated version of the audiovisual.

6. A content on demand server configured to transmit an audiovisual document to a first receiver and a second receiver, the content on demand server comprising:
    a database containing audiovisual documents;
    a processor;
    a first interface; and
    a second interface,
    wherein the processor is configured to:
    receive a request for transmission of the audiovisual document from the first receiver via the first interface;
    establish a unicast link between the content on demand server and the first receiver via the second interface;
    initiate transmission of the audiovisual document to the first receiver via the unicast link;
    receive a request for transmission of the audiovisual document from the second receiver via the first interface during transmission of the audiovisual document to the first receiver via the unicast link;
    transmit to the second receiver via the first interface a proposal for transmission of a truncated version of the audiovisual document for a price value less than a price value proposed to the first receiver for the transmission of the audiovisual document, wherein the truncated version of the audiovisual document is that part of the audiovisual document that has not yet been transmitted to the first receiver, wherein the price value proposed to the second receiver is dependent on an amount of traffic on a network used for transmission of the audiovisual document or is proportional to a duration of the truncated version of the audiovisual document;
    receive a request from the second receiver via the first interface for transmission of the truncated version of the audiovisual document;
    establish a multicast link between the content on demand server and the first receiver and the second receiver via the second interface;
    initiate transmission of the truncated version of the audiovisual document to the first receiver and to the second receiver via the multicast link; and
    terminate the unicast link between the content on demand server and the first receiver via the second interface.

7. The content on demand server according to claim 6, wherein the transmission of the truncated version of the audiovisual document is only proposed to the second receiver up to the transmission of a predetermined fraction of the audiovisual document to the first receiver.

8. The content on demand server according to claim 6, wherein the content on demand server is configured to transmit dynamic summary of said audiovisual document to the second receiver to provide information on contents of a fraction of the audiovisual document already transmitted to the first receiver.

9. The content on demand server according to claim 6, wherein the content on demand server is configured to transmit to the second receiver a fraction of audiovisual document already transmitted to the first receiver for recording by the second receiver.

10. A method implemented in a receiver for receiving an audiovisual document from a content on demand server, the method comprising the following steps:
    requesting transmission of the audiovisual document from the content on demand server;
    receiving from the content on demand server a proposal for transmission of a truncated version of the audiovisual document for a price value less than a price value proposed to a first receiver for the transmission of the audiovisual document, wherein the truncated version of the audiovisual document is that part of the audiovisual document that has not yet been transmitted to the first receiver via an active unicast link, wherein the price value for the proposal for transmission of a truncated version of the audiovisual document is dependent on an amount of traffic on a network used for transmission of the audiovisual document or is proportional to a duration of the truncated version of the audiovisual document;
    requesting transmission of the truncated version of the audiovisual document from the content on demand server; and
    receiving the truncated version of the audiovisual document from the content on demand server via a multicast link to the content on demand server.

11. A receiver configured to receive an audiovisual document from a content on demand server, the receiver comprising:
    an interface; and
    a processor;
    wherein the processor is configured to:
    request transmission of the audiovisual document from the content on demand server via the interface;
    receive from the content on demand server via the interface a proposal for transmission of a truncated version of the audiovisual document for a price value less than a price value proposed to a first receiver for the transmission of the audiovisual document, wherein the truncated version of the audiovisual document is that part of the audiovisual document that has not yet been transmitted to the first receiver via an active unicast link, wherein the price value for the proposal for transmission of a truncated version of the audiovisual document is dependent on an amount of traffic on a network used for transmission of the audiovisual document or is proportional to a duration of the truncated version of the audiovisual document;

request transmission of the truncated version of the audiovisual document from the content on demand server via the interface; and receiving the truncated version of the audiovisual document from the content on demand server via a multicast link to the content on demand server via the interface.

* * * * *